US012665914B2

(12) United States Patent
Ueno et al.

(10) Patent No.: US 12,665,914 B2
(45) Date of Patent: Jun. 23, 2026

(54) VEHICLE SECURITY ANALYSIS APPARATUS, AND METHOD AND PROGRAM STORAGE MEDIUM

(71) Applicants: NTT Docomo Business, Inc., Tokyo (JP); NTT Security (Japan) KK, Tokyo (JP)

(72) Inventors: Satoshi Ueno, Tokyo (JP); Atsushi Wakasugi, Yokohama (JP); Kensuke Nakata, Tokyo (JP); Yasunobu Chiba, Tokyo (JP)

(73) Assignees: NTT Docomo Business, Inc., Tokyo (JP); NTT Security (Japan) KK, Tokyo (JP)

( * ) Notice: Subject to any disclaimer, the term of this patent is extended or adjusted under 35 U.S.C. 154(b) by 122 days.

(21) Appl. No.: 18/583,198

(22) Filed: Feb. 21, 2024

(65) Prior Publication Data

US 2024/0236131 A1 Jul. 11, 2024

Related U.S. Application Data

(63) Continuation of application No. PCT/JP2022/035182, filed on Sep. 21, 2022.

(30) Foreign Application Priority Data

Sep. 24, 2021 (JP) ................................. 2021-155773

(51) Int. Cl.
*G06F 21/00* (2013.01)
*H04L 9/40* (2022.01)
(52) U.S. Cl.
CPC ...... *H04L 63/1425* (2013.01); *H04L 63/1433* (2013.01)

(58) Field of Classification Search
CPC ............. H04L 63/1425; H04L 63/1433; G06F 21/552; G06F 21/55; B60R 16/023
See application file for complete search history.

(56) References Cited

U.S. PATENT DOCUMENTS

2021/0044612 A1 2/2021 Kawauchi et al.
2021/0237665 A1 8/2021 Tamura et al.
(Continued)

FOREIGN PATENT DOCUMENTS

JP 2018-185712 A 11/2018
JP 2019-37002 A 3/2019
(Continued)

OTHER PUBLICATIONS

International Preliminary Report on Patentability and Written Opinion issued Apr. 4, 2024, in PCT/JP2022/035182, 6 pages.
(Continued)

*Primary Examiner* — Michael M Lee
(74) *Attorney, Agent, or Firm* — Oblon, McClelland, Maier & Neustadt, L.L.P.

(57) ABSTRACT

The vehicle security analysis apparatus generates, based on sensor log data items generated in in-vehicle devices, a combination of sensor log data items by associating a plurality of sensor log data items having a possibility of constituting the same individual attack, and identifies an individual attack pattern by comparing this combination of the sensor log data items with individual attack knowledge information. Next, a combination of a plurality of individual attack patterns that have occurred within a predetermined time period is compared with attack scenario knowledge information to identify an attack scenario. Then, the analysis result including the identified individual attack pattern and attack scenario is output.

11 Claims, 11 Drawing Sheets

(56)　　　　　　References Cited

U.S. PATENT DOCUMENTS

| | | | |
|---|---|---|---|
| 2021/0258328 A1 * | 8/2021 | Appel | H04L 67/12 |
| 2021/0306361 A1 * | 9/2021 | Tanaka | H04L 63/1416 |
| 2021/0344700 A1 | 11/2021 | Ueno et al. | |
| 2022/0103583 A1 * | 3/2022 | Torisaki | H04L 63/1441 |
| 2022/0182404 A1 | 6/2022 | Kishikawa et al. | |
| 2022/0247772 A1 | 8/2022 | Ishida et al. | |
| 2023/0379351 A1 * | 11/2023 | Mizushima | G06F 21/57 |

FOREIGN PATENT DOCUMENTS

| | | |
|---|---|---|
| JP | 2019-102023 A | 6/2019 |
| JP | 2020-119090 A | 8/2020 |
| WO | WO 2021/131193 A1 | 7/2021 |
| WO | WO 2021/144859 A1 | 7/2021 |

OTHER PUBLICATIONS

International Search Report issued Dec. 6, 2022 in PCT/JP2022/035182 filed on Sep. 21, 2022, 2 pages.

Extended European Search Report issued Nov. 19, 2024 in European Patent Application No. 22872936.4, 9 pgs.

* cited by examiner

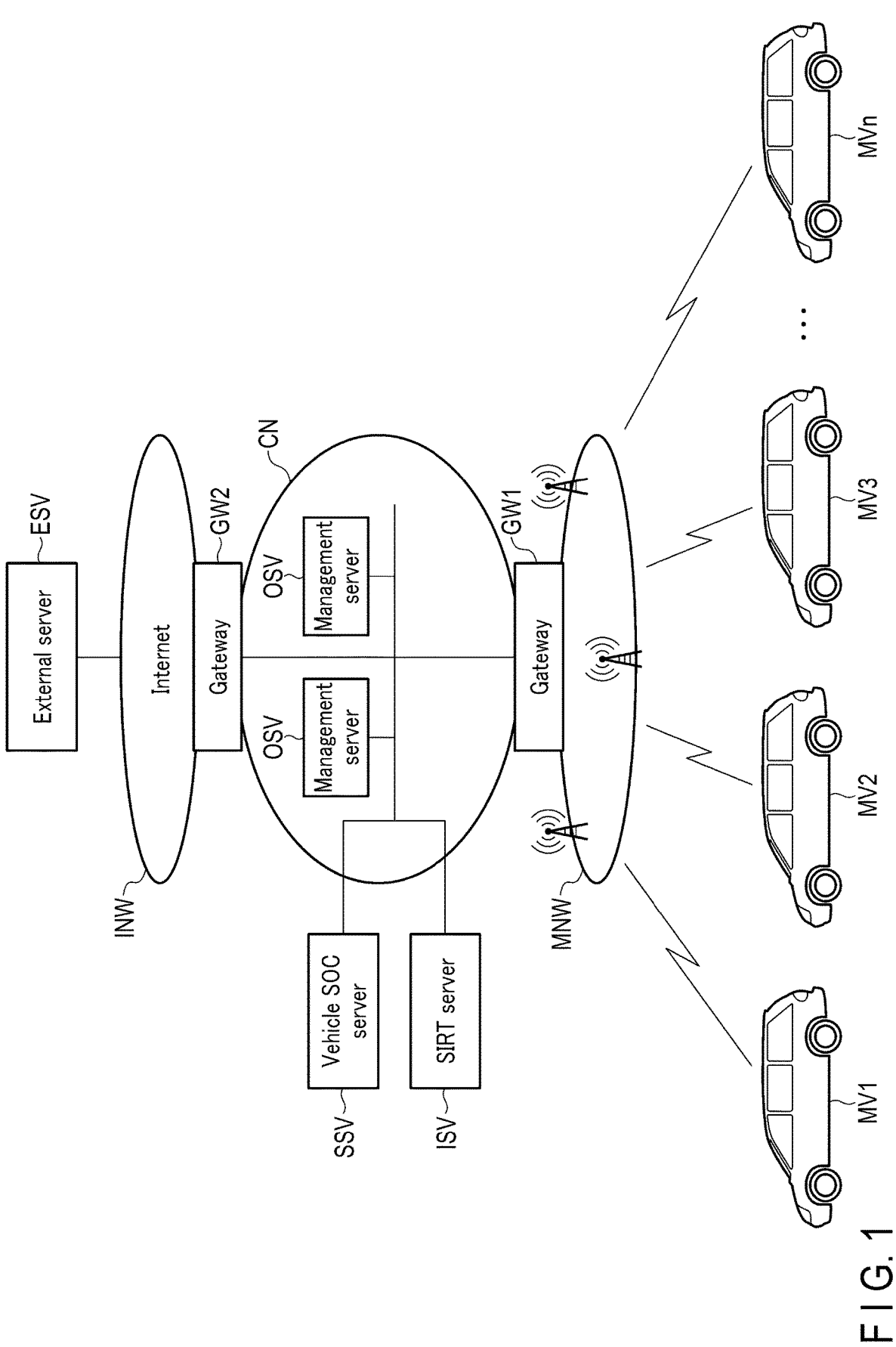
F I G. 1

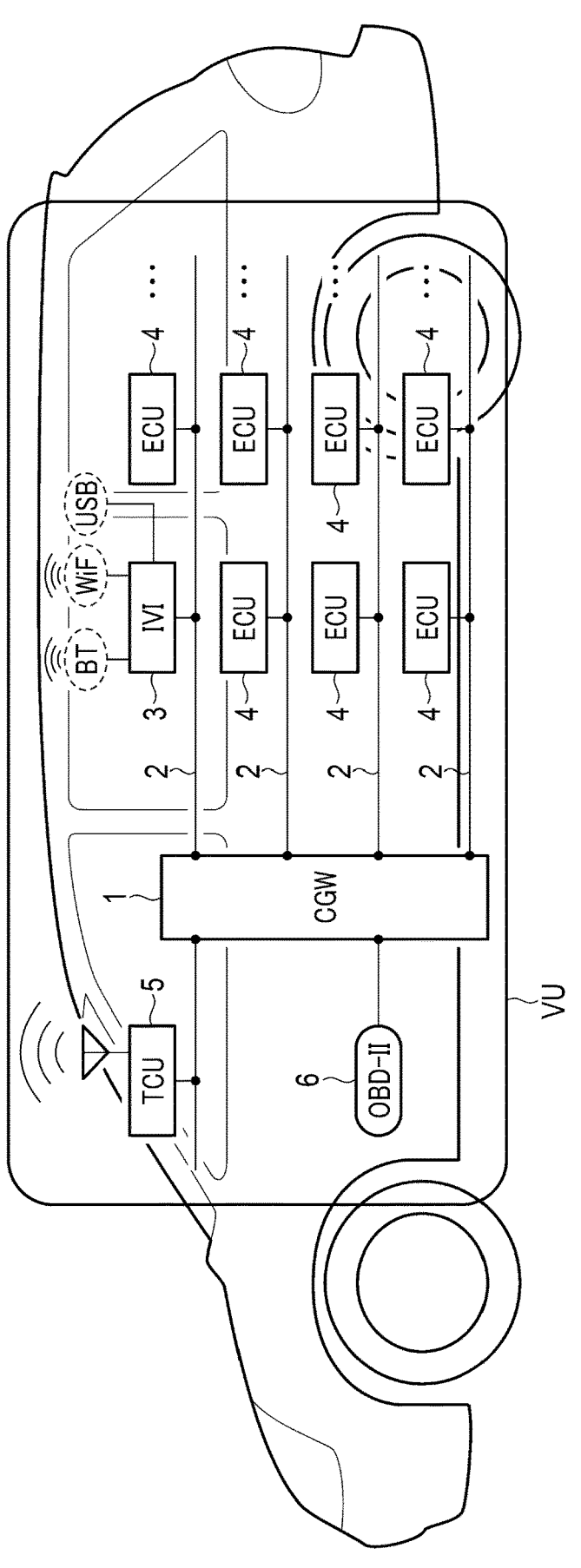
F I G. 2

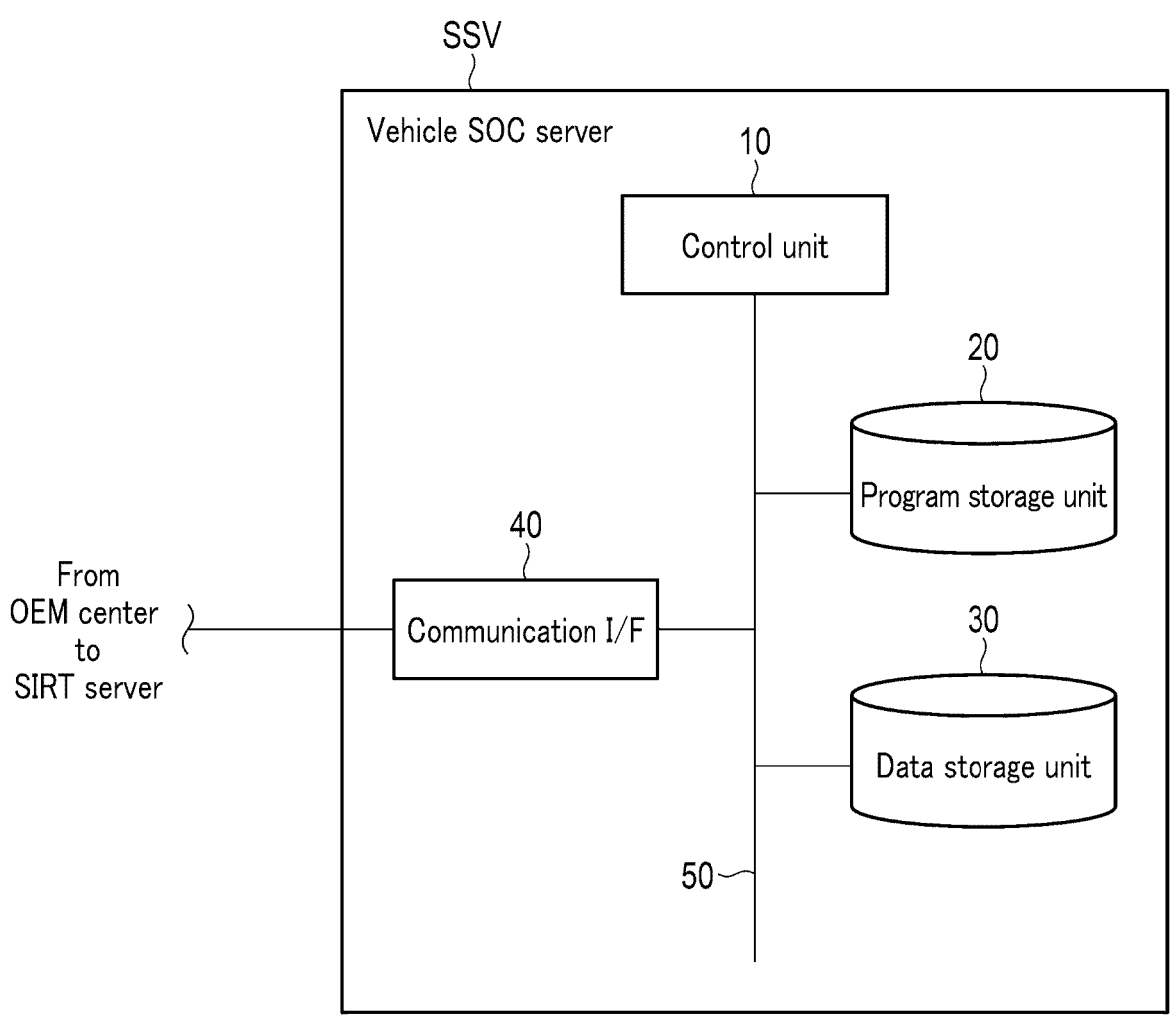
F I G. 3

F I G. 4
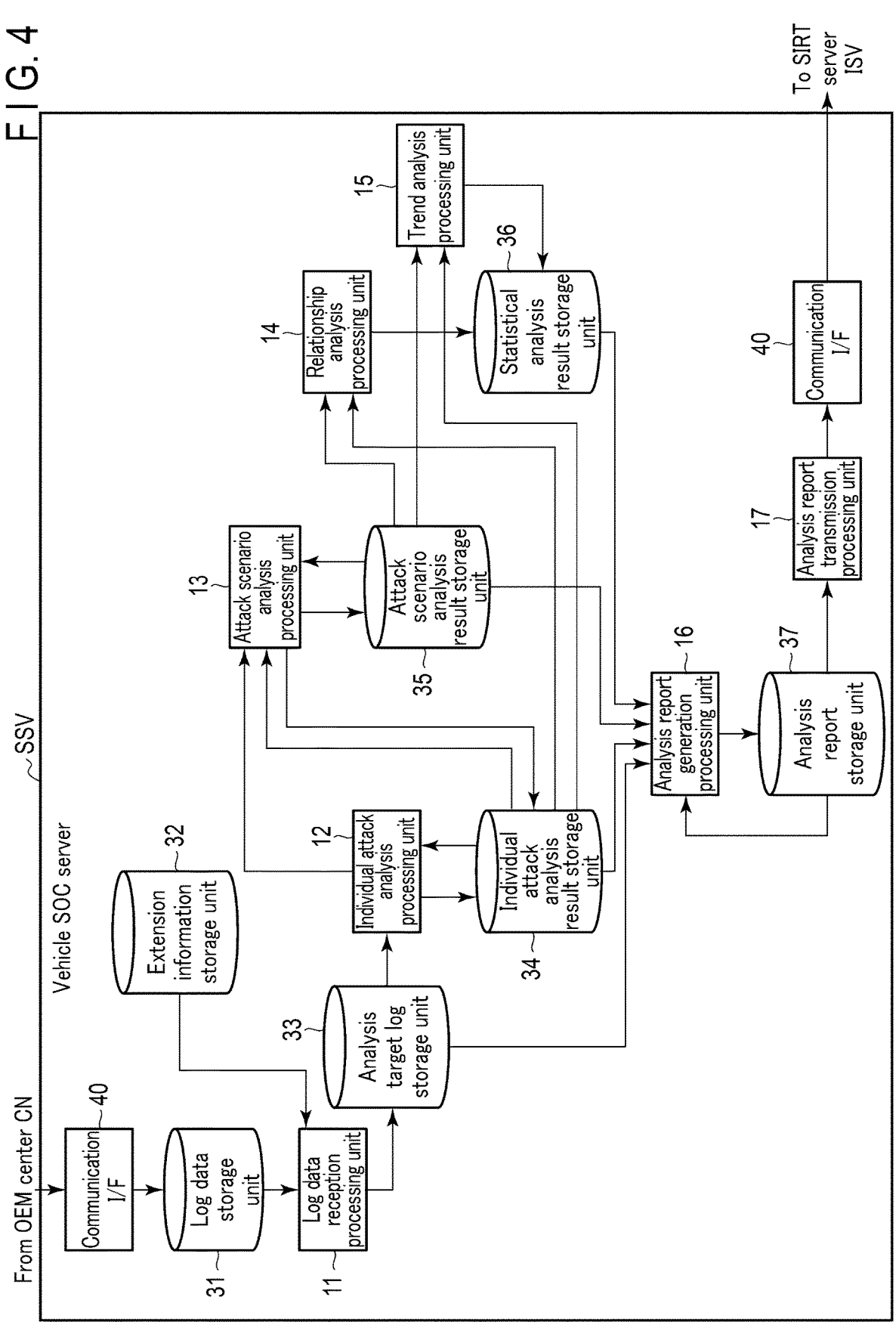

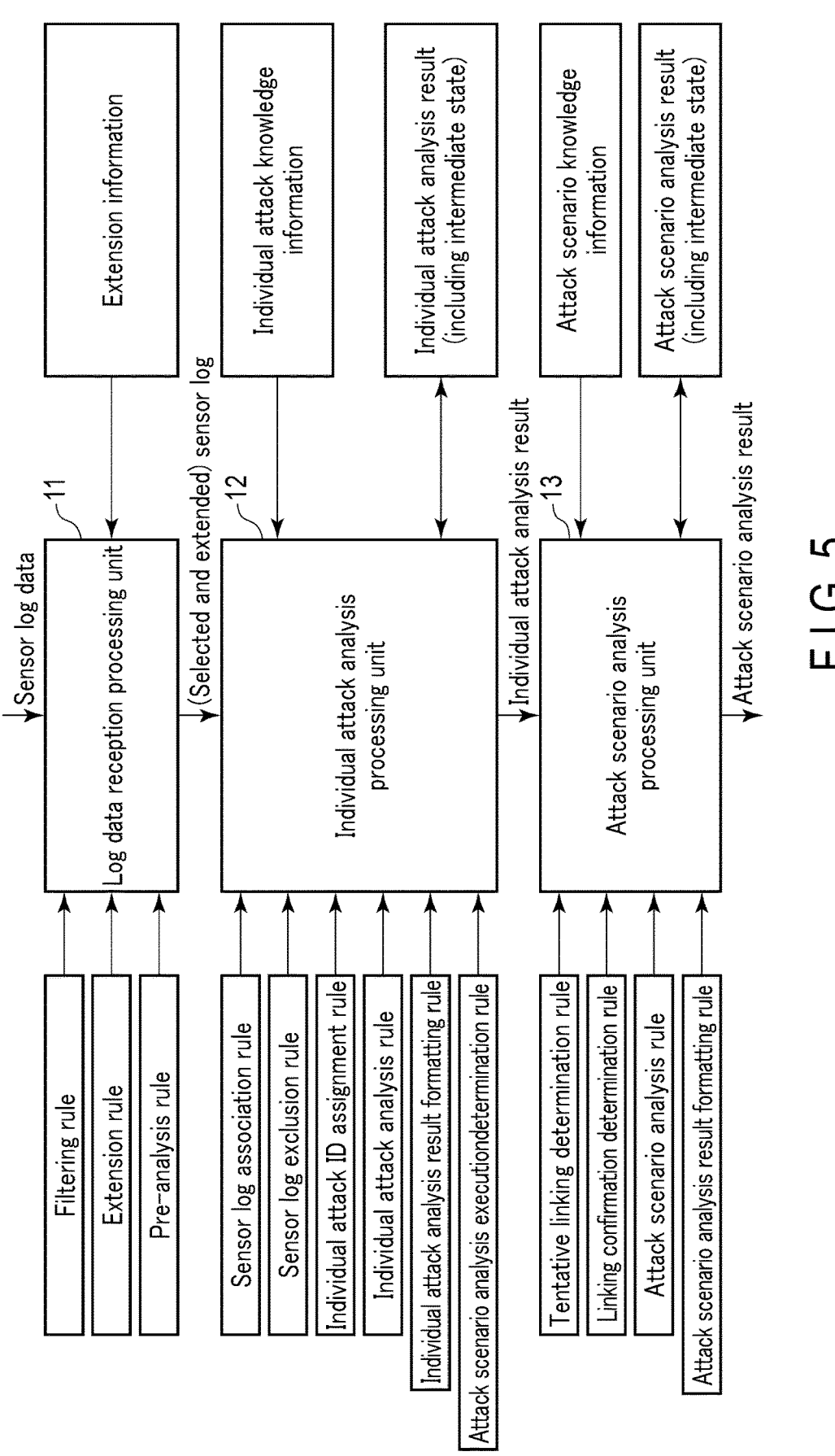
F I G. 5

<Overall process>
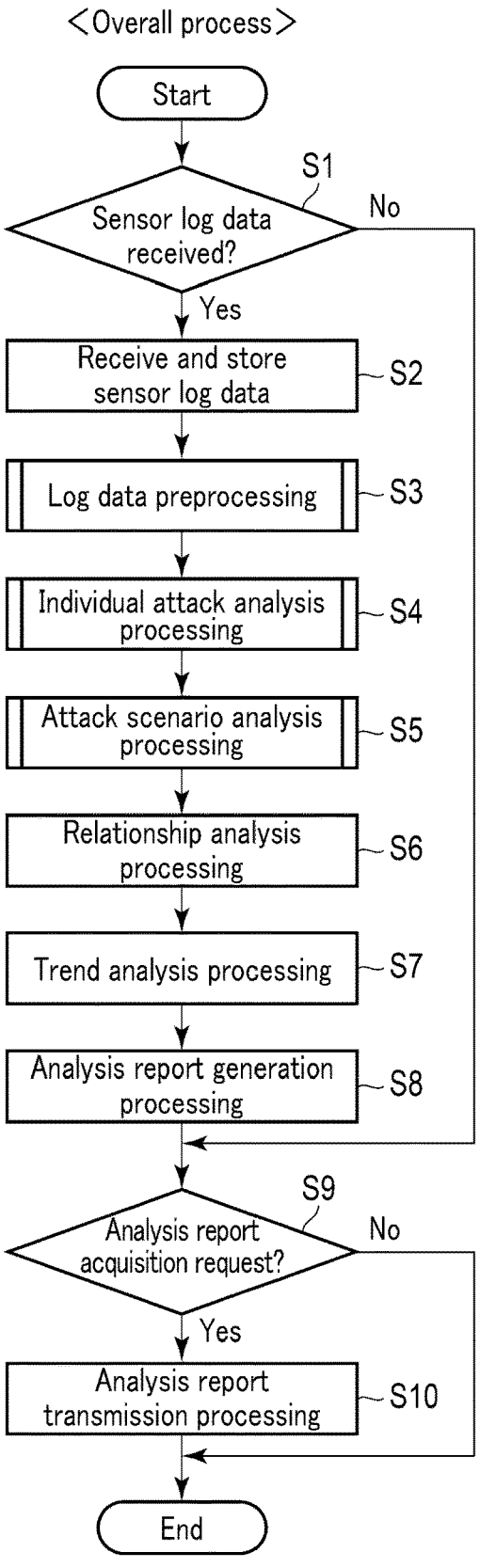
F I G. 6

<Log data preprocessing>

<Individual attack analysis processing>

<Attack scenario analysis processing>
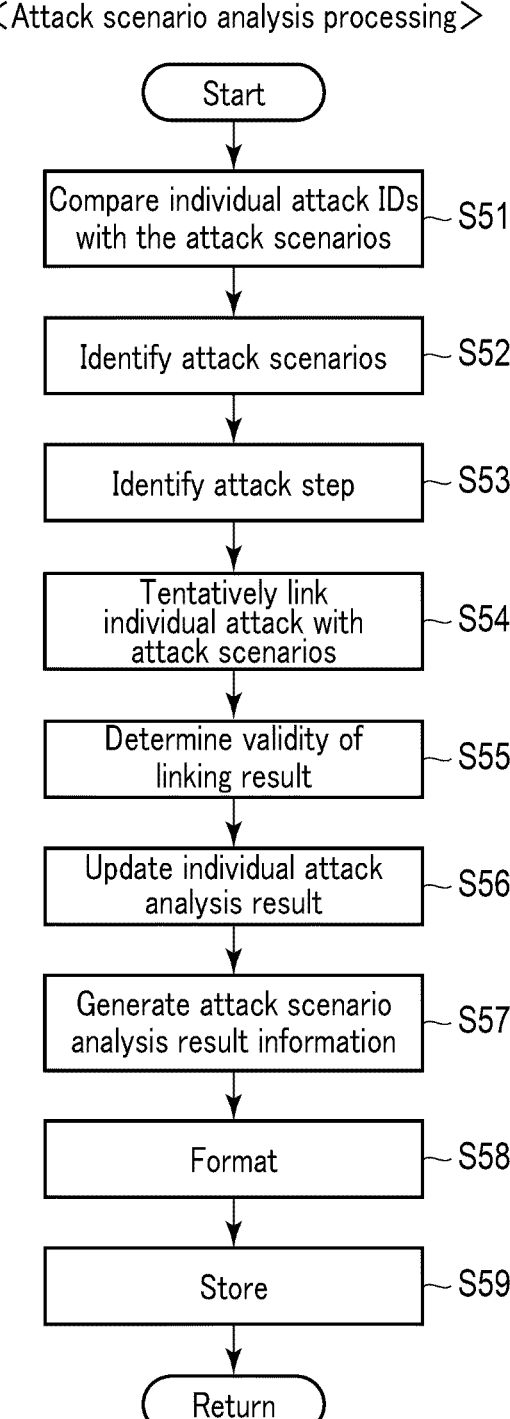
F I G. 9

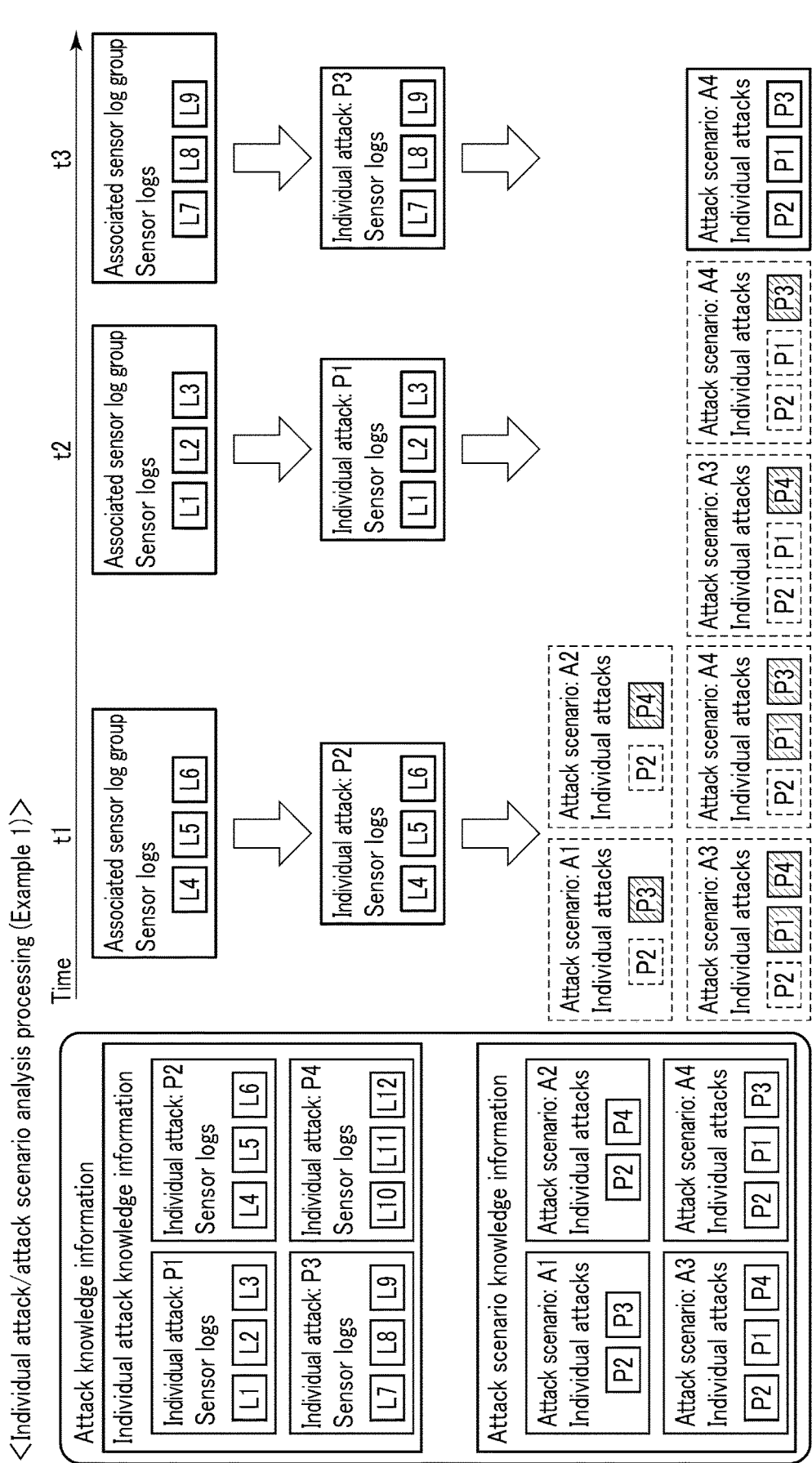
F I G. 10

VEHICLE SECURITY ANALYSIS APPARATUS, AND METHOD AND PROGRAM STORAGE MEDIUM

CROSS REFERENCE TO RELATED APPLICATIONS

This application is a Continuation Application of PCT Application No. PCT/JP2022/035182, filed Sep. 21, 2022 and based upon and claiming the benefit of priority from Japanese Patent Application No. 2021-155773, filed Sep. 24, 2021, the entire contents of all of which are incorporated herein by reference.

FIELD

An aspect of the present invention relates to a vehicle security analysis apparatus for monitoring and analyzing the security state of an in-vehicle network constructed, for example, in a vehicle, and a method and a program storage medium.

BACKGROUND

In recent years, automobile manufacturers have been engaged in development of connected vehicles, which enable transmission and reception of various kinds of data between an in-vehicle network including an electronic control unit (ECU) and a server of an external network. Connected vehicles are highly useful in realization of advanced services relating, for example, to updating of map data on a navigation system and automatic driving. These connected vehicles, however, are susceptible to cyberattacks through an external network, using malware, viruses, or the like due to the in-vehicle network that is connected to the external network.

For this reason, various techniques have been considered these days, with which types and details of cyberattacks on an in-vehicle system are analyzed by establishing a security operation center (SOC) (see Patent Document 1, for example).

CITATION LIST

Patent Literature

Patent Document 1: Jpn. Pat. Appln. KOKAI Publication No. 2020-119090

SUMMARY

Technical Problem

A majority of vehicle security operation centers are of a type that analyzes an attack on a vehicle as an individual attack. It is assumed, however, that cyberattacks on connected vehicles will become more diversified in the future, making it more difficult to accurately analyze such diversified attacks with the existing vehicle SOCs.

The present invention has been conceived in view of the above circumstances. An object of the present invention is to provide a technique capable of identifying an attack scenario not only from isolated attacks but also from the relationship between multiple patterns of individual attacks that have occurred within a predetermined time period among diversified cyberattacks.

Solution to Problem

In order to solve the above problem, one aspect of the present invention is directed to a vehicle security analysis apparatus or an analysis method for acquiring and analyzing sensor log data relating to an operating state of an in-vehicle device mounted on a vehicle, comprising: a log data acquisition unit or a process for acquiring and storing the sensor log data; a first analysis processing unit or a process for generating a combination of a plurality of the sensor log data that may constitute the same individual attack among a plurality of the stored sensor log data, identifying a corresponding individual attack pattern by matching the generated combination of the sensor log data with a plurality of individual attack patterns predefined as knowledge information of the individual attack, and generating first analysis information including information representing the identified individual attack pattern; and a second analysis processing unit or process for matching a plurality of the individual attack patterns obtained within a predetermined period with a plurality of attack scenarios predefined as attack scenario knowledge information, specifying the attack scenario composed of the plurality of individual attack patterns, and generating second analysis information including information representing the specified attack scenario; and an analysis result output processing unit or process for outputting an analysis result including the generated first analysis information and the second analysis information.

According to an aspect of the present invention, an individual attack pattern is identified based on a plurality of sensor log data items generated from in-vehicle devices, first by focusing on a combination of sensor log data items which may constitute the same individual attack. Next, by focusing on a combination of individual attack patterns obtained within a predetermined time period, an attack scenario is identified. Then, the identified individual attack pattern and attack scenario are output as an analysis result.

Advantageous Effects of Invention

It is possible to identify an attack scenario not only from isolated individual attacks that have occurred but also from the relationship between patterns of multiple individual attacks that have occurred within a predetermined period.

BRIEF DESCRIPTION OF THE DRAWINGS

FIG. 1 is a diagram showing an example of the overall configuration of a vehicle security surveillance system according to an embodiment of the present invention.

FIG. 2 is a diagram showing an example of the configuration of an in-vehicle device that is an analysis target of cyber security in the illustrated system.

FIG. 3 is a block diagram showing a hardware configuration of the vehicle security analysis apparatus according to the embodiment of the present invention.

FIG. 4 is a block diagram showing a functional configuration of the vehicle security analysis apparatus according to the embodiment of the present invention.

FIG. 5 is a diagram showing exemplary information that is input and output at the log reception processing unit, the individual attack analysis processing unit, and the attack scenario analysis processing unit in the vehicle security analysis apparatus of FIG. 4.

FIG. 6 is a flowchart showing an example of the entire procedure and details of the process executed by the vehicle security analysis apparatus of FIG. 4.

FIG. 9 is a flowchart showing an exemplary procedure and details of the attack scenario analysis processing of FIG. 6.

FIG. 10 is a diagram for explaining an exemplary individual attack analysis processing and the attack scenario analysis processing in the processing procedure of FIG. 6.

DETAILED DESCRIPTION

Figure 7:
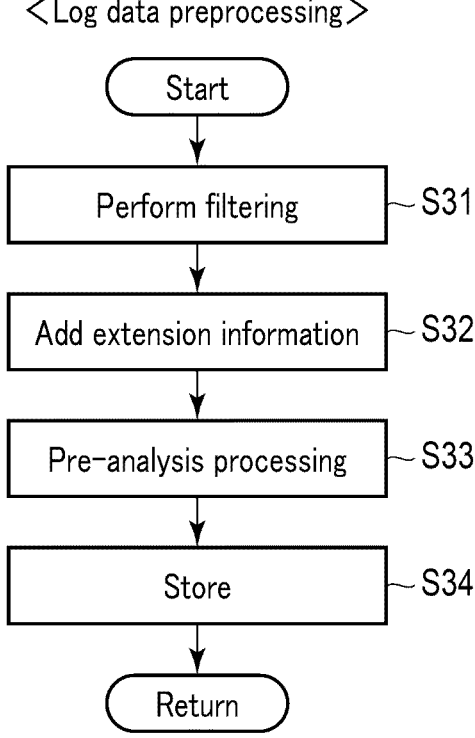
FIG. 7 is a flowchart showing an exemplary procedure and details of log preprocessing in the processing procedure of FIG. 6.

Embodiments of the present invention will be described below with reference to the drawings.

Embodiment (Exemplary Configuration)
(1) System

FIG. 1 is a diagram showing an exemplary configuration of a vehicle security surveillance system according to an embodiment of the present invention.

The vehicle security surveillance system according to the present embodiment includes, for example, an original equipment manufacturing (OEM) center CN operated by an automobile manufacturer. In general, an OEM center CN is established for each automobile manufacturer. The OEM center CN of an automobile manufacturer will be described as an example.

The OEM center CN of the automobile manufacturer is configured to perform data transmission with a plurality of vehicles MV1 to MVn managed by the manufacturer through a mobile communication network MNW and a gateway GW1. The OEM center CN includes a management server OSV. The OEM center CN provides the vehicles MV1 to MVn with various types of services for these vehicles under the control of the management server OSV. The OEM center CN also has functions of collecting sensor log data transmitted from the vehicles MV1 to MVn via the mobile communication network MNW and the gateway GW1, and distributing software and software setting information to the vehicles MV1 to MVn.

As the mobile communication network MNW, a cellular mobile communication network or a wireless local area network (LAN) may be used, which is not a limitation.

A security operation center (SOC) server SSV is connected to the OEM center CN of the automobile manufacturer. The vehicle SOC server SSV is operated as a vehicle security analysis apparatus according to the embodiment of the present invention, and its functions will be described in detail later.

The OEM center CN of the automobile manufacturer is also connected to the Internet INW via a gateway GW2 so that data can be transmitted to and from the external server ESV via the Internet INW. The external server ESV may be operated and managed, for example, by an automotive information sharing and analysis center (Auto-ISAC). The external server ESV includes a database, which accumulates threat information relating to connected-vehicle-related cyber threats and potential vulnerabilities, and provides the information accumulated in the database to the vehicle SOC server SSV.

The vehicle security surveillance system further includes a security incident response team (SIRT) server ISV operated, for example, by the corresponding automobile manufacturer. The SIRT server ISV can transmit data to and from the OEM center CN of this automobile manufacturer and to and from the vehicle SOC server SSV.

The SIRT server ISV is operated, for example, by an automobile manufacturer or an organization (SIRT) that provides safety management, support, and incident responses, which are necessary throughout the development life cycle of the in-vehicle device. The SIRT server ISV includes, for example, a threat information database that stores cyber threat information unique to the automobile manufacturer, and transmits the cyber threat information to the vehicle SOC server SSV in response to a request from the vehicle SOC server SSV.

The SIRT server ISV presents to the administrator of the SIRT a security analysis report, for example, provided from the vehicle SOC server SSV. The SIRT server ISV has a function of, if the administrator of the SIRT inputs a course of action or the like determined for a specific automobile manufacturer based on the analysis report, transmitting a recall instruction including this course of action and the like to the vehicle. The cyber threat information may be defined by a combination of the type of threat and the degree of risk. The analysis report may also be described with the combination of the type of threat and the degree of risk.

(2) Devices
(2-1) In-Vehicle Device VU

FIG. 2 is a block diagram showing an exemplary configuration of an in-vehicle device VU mounted in each of the vehicles MV1 to MVn.

The in-vehicle device VU includes a plurality of electronic control units (ECU) 4. Each ECU 4 is connected to an in-vehicle gateway (CGW) 1 via an in-vehicle network 2, which may be referred to as a control area network (CAN). The CGW 1 is connected to a communication control unit (TCU) 5 and a navigation apparatus (IVI) 3.

Each ECU 4 causes the processor to execute a program so as to perform a certain control function, and is used, for example, as a device for controlling the engine, transmission, steering angle, accelerator, brake, and the like, a device for controlling the turn signal, lights, and wipers, a device for controlling the door locks and the opening and closing of windows, a device for controlling air conditioning, or the like. The vehicles MV1 to MVn are provided with various sensors including vehicle sensors such as a speed sensor, a temperature sensor, and a vibration sensor for measurement data relating to the operations of the vehicle, in-vehicle sensors for monitoring the interior state of the vehicle including the driver and the like, and exterior sensors for monitoring the exterior state of the vehicle. The ECUs 4 are used as devices that retrieve the sensing data output from these sensors. The ECUs 4 are also used as a device for monitoring the automatic driving control device or the state of the driver. In any case, the ECUs 4 retrieve sensing data that is output from different sensors, and execute predetermined control processing.

The TCU 5 is used for conducting wireless communications between an in-vehicle device VU and the mobile communication network MNW using, for example, the Transmission Control Protocol/Internet Protocol (TCP/IP).

The TCU 5 may be used for transmitting and receiving telephone call data of a driver or a passenger, receiving navigation update data from a website, and transmitting log data representing a detection result of the operation state of each component of the in-vehicle device VU to the OEM center CN of the automobile manufacturer.

The IVI 3 includes a USB port and a wireless interface, having a function of writing and reading various kinds of data to and from a USB device (not shown) through the USB port, transmitting and receiving data to and from a portable terminal such as a smartphone through the wireless interface, and transmitting and receiving data to and from the outside. Examples of the wireless interface may include Bluetooth (trademark) and WiFi (trademark).

The TCU 5 and the IVI 3 are each provided with a sensor. These sensors monitor the operations of the TCU 5 and IVI 3 themselves, and also monitor invasion of viruses and the like through the mobile communication network MNW or through the wireless interfaces and USB terminals. The TCU 5 and IVI 3 transmit the detection results of abnormalities and the like detected by the sensors of the TCU 5 and IVI 3 to the OEM center CN as a sensor log, together with the detection results of abnormalities detected by the sensors in the ECUs 4 and CGW 1.

The in-vehicle device VU includes an external interface port (OBD-II) 6. A testing apparatus or a personal computer may be connected to this OBD-II port 6. The testing apparatus and personal computer may be used for testing the ECUs 4 and installing an update program and control information in the ECUs 4.

The CGW 1 performs an IP-CAN protocol conversion at the time of transmitting data between the TCU 5 and each of the ECUs 4, the IVI 3, and the OBD-II port 6. The CGW 1 is also provided with a sensor for monitoring operational abnormalities and the like so that the CGW 1 can transmit as a sensor log the detection result of the operational abnormality and the like obtained by the sensor from the TCU 5 to the OEM center CN.

(2-2) Vehicle SOC Server SSV

FIGS. 3 and 4 are block diagrams showing the hardware configuration and software configuration, respectively, of the vehicle SOC server SSV.

The vehicle SOC server has a function of analyzing a cyberattack that the vehicles MV1 to MVn have encountered, in place of, or supplementarily to, the OEM center CN of the automobile manufacturer, and providing the SIRT server ISV of the corresponding automobile manufacturer with an analysis report generated based on the analysis result.

The vehicle SOC server SSV is constituted by a server computer provided, for example, on a cloud and includes a control unit 10 adopting a hardware processor such as a central processing unit (CPU). The vehicle SOC server SSV is configured by connecting a storage unit, which includes a program storage unit 20 and a data storage unit 30, and a communication interface (I/F) 40 to the control unit 10 via a bus 50.

The communication I/F 40 performs data transmission with the OEM center CN and the SIRT server ISV of an automobile manufacturer, using a communication protocol defined by the network NW under the control of the control unit 10.

As a storage medium, the program storage unit 20 is configured, for example, by combining a nonvolatile memory such as a hard disk drive (HDD) or solid state drive (SSD) to which writing and reading can be performed at any time with a nonvolatile memory such as a read only memory (ROM). In addition to the middleware such as the operating system (OS), the program storage unit 20 stores any programs necessary to execute various controlling processes relating to the embodiment of the present invention.

As a storage medium, the data storage unit 30 is configured, for example, by combining a non-volatile memory such as an HDD or an SSD, in which writing and reading can be performed at any time, with a volatile memory such as a Random Access Memory (RAM). As storage areas necessary for implementing the embodiment of the present invention, the data storage unit 30 includes a log data storage unit 31, an extension information storage unit 32, an analysis target log storage unit 33, an individual attack analysis result storage unit 34, an attack scenario analysis result storage unit 35, a statistical analysis result storage unit 36, and an analysis report storage unit 37.

The log data storage unit 31 is used for temporarily storing all the sensor log data acquired from the OEM center CN of the automobile manufacturer in association with the identification information of the automobile manufacturer or the identification information of the source OEM center CN.

The extension information storage unit 32 prestores extension information required for the analysis of individual attacks and attack scenarios. The extension information includes, for example, a system configuration, GeoIP for identifying an area from an IP address, reverse geocoding for finding an address from the latitude and longitude, a common vulnerability identifier CVE, and domain owner information Whois.

The analysis target log storage unit 33 is used for storing analysis target log data extracted from the sensor log data stored in the log data storage unit 31.

The individual attack analysis result storage unit 34 is used for storing information representing an analysis result of an individual attack, which is obtained by analyzing the analysis target log data.

The attack scenario analysis result storage unit 35 is used for storing information representing the analysis result of the attack scenario, which is obtained by further analyzing the analysis result of the individual attack.

The statistical analysis result storage unit 36 is used for storing statistical information including information indicating the relationship between attacks on multiple vehicles and trends in the attacks, which is obtained through the analysis based on the analysis result of the individual attacks and the analysis result of the attack scenario.

The analysis report storage unit 37 is used for storing analysis report information generated based on the analysis target log data, the analysis result of the individual attacks, the analysis result of the attack scenario, and the statistical information.

The control unit 10 includes, as processing functions according to an embodiment of the present invention, a log data reception processing unit 11, an individual attack analysis processing unit 12, an attack scenario analysis processing unit 13, a relationship analysis processing unit 14, a trend analysis processing unit 15, an analysis report generation processing unit 16, and an analysis report transmission processing unit 17. All of these processing units 11 to 17 are realized by causing the hardware processor of the control unit 10 to execute a program stored in the program storage unit 20.

FIG. 5 is a diagram showing exemplary data that is input and output at the log data reception processing unit 11, the individual attack analysis processing unit 12, and the attack scenario analysis processing unit 13 relating to the present invention, among the processing units 11 to 17, together with the processing rules followed by the processing units 11 to 13. Each processing rule is realized by a program stored in the program storage unit 20.

In FIG. 5, the sensor log association rule, the sensor log exclusion rule, the individual attack ID assignment rule, the individual attack analysis rule, the individual attack analysis result formatting rule, and the attack scenario analysis execution determination rule constitute an individual attack detection logic. Furthermore, the tentative linking determination rule, the linking confirmation determination rule, the attack scenario analysis rule, and the attack scenario analysis result formatting rule constitute an attack scenario detection logic.

The log data reception processing unit 11 reads the sensor log data from the log data storage unit 31, extracts the analysis target log data from the sensor log data in accordance with the filtering rule, and adds the extension information thereto according to the extension rule. The log data reception processing unit 11 may perform pre-analysis processing as needed in accordance with the pre-analysis rule, and the analysis target log data, for which the processing is completed, is stored in the analysis target log storage unit 33.

The individual attack analysis processing unit 12 reads the analysis target log data items from the analysis target log storage unit 33, and generates a combination of log data items by associating log data items from among the analysis target log data items that have been read out in accordance with the sensor log association rule and the sensor log exclusion rule if the log data items represent a high possibility of the same individual attack.

The individual attack analysis processing unit 12 further identifies an individual attack pattern corresponding to the generated combination of the log data items in accordance with the individual attack ID assignment rule by referring to the individual attack knowledge information prepared in advance. Then, the individual attack analysis processing unit 12 describes the values included in the sensor log data items that constitute the identified individual attack pattern on a template defined for each individual attack in accordance with the individual attack analysis rule, thereby generating information that represents the individual attack analysis result.

Still further, the individual attack analysis processing unit 12 formats the above information representing the analysis result in accordance with the individual attack analysis result formatting rule as needed, and determines whether or not the analysis result of the individual attack is providable for the analysis of the attack scenario in accordance with the attack scenario analysis execution determination rule. The individual attack analysis result information determined to be providable is stored in the individual attack analysis result storage unit 34 as analysis information representing a "point" attack upon an individual vehicle.

The attack scenario analysis processing unit 13 reads the analysis results of different individual attack patterns obtained from the individual attack analysis result storage unit 34 within a predetermined period. Then, the attack scenario analysis processing unit 13 compares the analysis results of the individual attack patterns with multiple attack scenarios defined by the attack scenario knowledge information prepared in advance in accordance with the tentative linking determination rule so as to identify the attack scenario including the individual attack pattern and also to identify a step position of the individual attack pattern in the attack scenario. Then, the attack scenario analysis processing unit 13 identifies the attack scenario in accordance with the linking confirmation determination rule based on the identified result of the attack scenario.

The attack scenario analysis processing unit 13 generates information indicating the analysis result of the attack scenario by describing, on a template defined for each attack scenario, the identified attack scenario, the individual attack patterns constituting the attack scenario, and values included in the sensor log data constituting the attack patterns in accordance with the attack scenario analysis rule.

The attack scenario analysis processing unit 13 further formats the analysis result of the attack scenario in accordance with the attack scenario analysis result formatting rule as needed. The information representing the analysis result of the attack scenario after the formatting process is stored in the attack scenario analysis result storage unit 35 as analysis information representing a series of attack scenarios ("line" attacks) for individual vehicles.

The relationship analysis processing unit 14 compiles the individual attacks or attack scenarios for the vehicles MV1 to MVn based on the analysis results of the individual attacks stored in the individual attack analysis result storage unit 34 or the analysis results of the attack scenarios stored in the attack scenario analysis result storage unit 35. Then, the relationship analysis processing unit 14 performs the process of storing the information of the compiled result as information representing one of a series of "plane" attacks on the vehicles MV1 to MVn in the statistical analysis result storage unit 36.

The trend analysis processing unit 15 analyzes the analysis result of the individual attack stored in the individual attack analysis result storage unit 34 or the analysis result of the attack scenario stored in the attack scenario analysis result storage unit 35 from arbitrary viewpoints. Then, the trend analysis processing unit 15 performs a process of storing information representing this analysis result in the statistical analysis result storage unit 36 as information representing one of a series of "plane" attacks on the vehicles MV1 to MVn.

The analysis report generation processing unit 16 generates analysis report information in accordance with a template prepared in advance, based on the analysis target log data, the analysis result of the individual attack, the analysis result of the attack scenario, and the statistical information. The analysis report information reflects the analysis result of the individual attack ("point" attack) on each vehicle, the analysis result of the attack scenario ("line" attacks), and the analysis result of the relationship between and trends in the attacks ("plane" attacks) on multiple vehicles. The analysis report generation processing unit 16 stores the generated analysis report information in the analysis report storage unit 37.

The analysis report transmission processing unit 17 is configured, for example, by an application programming interface (API) server. In response to an acquisition request sent from the SIRT server ISV, the analysis report transmission processing unit 17 performs a process of reading the analysis report information from the analysis report storage unit 37 and transmitting the read-out analysis report information through the communication I/F 40 to the request source SIRT server ISV.

(Exemplary Operations)

Next, exemplary operations of the vehicle SOC server SSV configured as above will be described.

(1) Types of Cyberattacks Relating to In-Vehicle Device VU

The types of cyberattacks on an in-vehicle device VU may include:

(a) An attack that causes malware infection or the like in communication devices (e.g., TCU 5 and IVI 3) in the vehicle-mounted device VU from a falsified website or an attacker terminal via the Internet INW;

(b) An attack that causes an operation against the driver's intention by transmitting a malicious remote operation command from an external wireless communication device to the communication device (e.g., TCU 5 or IVI 3) of the in-vehicle device VU;

(c) An attack that involves an unauthorized connection of an external terminal such as a personal computer to the OBD-II port 6 and an input of an unauthorized command to an ECU 4 or the like from this external terminal to change the setting of the ECU 4, exploit the information of the ECU 4, or cause an operation against the driver's intention;

(d) An attack that involves a connection of a mobile terminal such as a smartphone infected with malware to a Bluetooth or WiFi wireless interface to transmit an unauthorized command to an ECU 4 or the like of the in-vehicle device VU, take over the OS, and rewrite the firmware or the like, using the mobile terminal as a foothold; and (e) An attack that involves infection of an application of the IVI 3 with malware to transmit an unauthorized command to an ECU 4 or the like of the in-vehicle device VU, take over the OS, and rewrite the firmware or the like.

The patterns of the cyberattacks may include the following different stages:

(1) Initial invasion: an exercise of infecting a communication device (TCU 5 or IVI 3) of the in-vehicle device VU with malware or the like (2) Infrastructure construction: an exercise of constructing remote-control infrastructure through C&C communications between a communication device (TCU 5 or IVI 3) infected with malware and the server or terminal of the attacker via the OEM center CN of an automobile manufacturer or the Internet INW (3) Internal invasion and investigation: an exercise of invading TCU 5, IVI 3, or CGW 1 and investigating the inside thereof (4) Purpose execution: exercises such as extracting information from TCU 5, IVI 3, or ECU 4, attacking a server connected to the OEM center CN or the Internet INW using TCU 5 or IVI 3 as a foothold, and remotely controlling components of the in-vehicle device VU such as ECUs 4 via TCU 5 or IVI 3

(5) Initial invasion+purpose execution: an exercise of, after invading the TCU 5 or IVI 3, exploiting the information, attacking a server connected to the OEM center CN or the Internet INW using the in-vehicle device VU as a foothold, and remotely controlling the components inside the in-vehicle device VU, such as ECUs 4, without the above-described steps of infrastructure construction and internal invasion/investigation.

In consideration of the above types and patterns of the cyberattacks, sensors are installed in the components of the in-vehicle device VU, such as the TCU 5, IVI 3, ECUs 4, and CGW 1.

For instance, the TCU 5 and IVI 3 are provided with a sensor of a host-installed type, which is configured to detect network-routed attacks in the TCU 5 or IVI 3. Such a sensor may have functions of detecting an attack by checking against threat intelligence (IP addresses); detecting as an abnormality the occurrence of an access (permission/rejection/discard) to a transmission/reception IP address or port which does not normally occur, the occurrence of login success/failure, or the occurrence of a transmission/reception media access control (MAC) address; detecting as an abnormality a verification error log of a secure socket layer/transport layer security (SSL/TLS) certificate; detecting as an abnormality the occurrence of a rejection log by verification of an identification filter in the CAN 2; detecting what is detected by the IDS inspection logic of the CAN 2 to be an abnormality; and detecting the occurrence of a MAC verification error in a CAN message to be an abnormality.

In addition, the TCU 5 and the IVI 3 are also provided with a sensor for detecting an attack that has occurred in the TCU 5 and the IVI 3. Such a sensor may have functions of determining what is detected from a signature of an antivirus to be an attack; determining what is detected through a sandbox dynamic analysis/behavior detection to be an attack; detecting as an abnormality a log at the time of an execution trial of a whitelisted execution prevention file; detecting a signature mismatch detection log as an abnormality; detecting a login success/failure that does not normally occur as an abnormality; detecting an authorization required operation that does not normally occur as an abnormality; detecting execution/termination of a process that does not normally occur as an abnormality; detecting an increase in resource usage that does not normally occur as an abnormality; and detecting a signature mismatch at the time of a secure boot as an abnormality.

The sensors respectively output sensor log data showing the detection result, for example, after the end of the communication. The sensor log data is transmitted, for example, from the TCU 5 of the in-vehicle device VU to the OEM center CN of the corresponding automobile manufacturer. A sensor is also installed in the OEM center CN of the automobile manufacturer. This sensor detects, on the network, any attack on the in-vehicle device VU via the network, and has substantially the same functions as the aforementioned sensor of a host-installed type. The sensor log data may also be referred to as a sensor log or as log data.

(2) Cyberattack Analysis in Vehicle SOC Server SSV

FIG. 6 is a flowchart showing an example of the entire processing procedure and processing contents of the vehicle SOC server SSV.

(2-1) Acquisition of Sensor Log Data

In the in-vehicle device VU of each of the vehicles MV1 to MVn, the sensors installed in the components such as the TCU 5 and the IVI 3 monitor the occurrence of an abnormality caused by a cyberattack, as described above. Upon detection of an abnormality that has occurred, the sensor log data showing this detection result is transmitted to the OEM center CN of the corresponding automobile manufacturer in association with the time stamp information indicating the detection time and identification information of the sensor or identification information of the component that has detected the occurrence of the abnormality such as the TCU 5 or IVI 3.

When the OEM center CN of the automobile manufacturer receives the sensor log data transmitted from the vehicles MV1 to MVn manufactured or sold/managed by this automobile manufacturer, the OEM center CN temporarily stores the received sensor log data in association with the time stamp information indicating the detection time or the reception time and the identification information of the detection source sensor or the identification information of the component in which the occurrence of the abnormality is detected. Then, in response to an acquisition request from the vehicle SOC server SSV, the sensor log data is transferred to the vehicle SOC server SSV together with the identification information of the automobile manufacturer.

In contrast, the control unit 10 of the vehicle SOC server SSV waits until the analysis target data acquisition timing at step S1, and when the acquisition timing arrives, the control unit 10 transmits an acquisition request to the OEM center CN of the automobile manufacturer at step S2. In response to the acquisition request, the control unit 10 receives via the communication I/F 40 the not-yet received sensor log data that is transferred from the OEM center CN. Further, the control unit 10 stores the received sensor log data in the log data storage unit 31 in association with the time stamp information indicating the detection time, the identification information of the detection source sensor or identification information of the component in which the occurrence of the abnormality is detected, and the identification information of the automobile manufacturer. That is, the vehicle SOC server SSV acquires the sensor log data through polling.

The process of acquiring the sensor log data by the vehicle SOC server SSV may be, instead of using the polling method, a process of passively acquiring the sensor log data that is autonomously transferred at the time of the OEM center CN receiving sensor log data from the vehicles MV1 to MV*n*.

(2-2) Preprocessing on Sensor Log Data

Prior to the analysis process, the control unit 10 of the vehicle SOC server SSV performs preprocessing on the sensor log data at step S3 under the control of the log data reception processing unit 11.

FIG. 7 is a flowchart showing the procedure and details of the preprocessing of log data by the log data reception processing unit 11.

The log data reception processing unit 11 reads, for example, sensor log data relating to the respective analysis target vehicles from the log data storage unit 31. At step S31, the log data reception processing unit 11 performs a process of selecting the necessary sensor log data by removing sensor log data that is not for the analysis, in accordance with the filtering rule. For instance, redundant sensor log data, sensor log data deemed unnecessary based on the type of the source sensor, and sensor log data deemed unnecessary based on the value of a log item may be excluded.

Subsequently, at step S32, the log data reception processing unit 11 reads from the extension information storage unit 32 the extension information necessary for the analysis of individual attacks and attack scenarios in the subsequent stages, and adds this extension information to the sensor log data that has been subjected to the filtering process, in accordance with the extension rule. As mentioned earlier, examples of the extension information to be added include the system configuration, GeoIP used for specifying an area from an IP address, reverse geocoding for finding an address from the latitude and longitude, a common vulnerability identifier CVE, and domain owner information Whois.

Thereafter, at step S33, the log data reception processing unit 11 performs a process of adding information necessary for the analysis at the subsequent stage to the selected and extended sensor log data, and determines whether the analysis of the subsequent stage needs to be conducted, in accordance with the pre-analysis rule. As the information to be added, the identification information of the communication source ECU 4 that has caused a log and the identification information of the communication destination ECU 4 are possible. In the determination, whether or not the sensor log data is the log that serves as a starting point of the analysis may be determined.

Finally, at step S34, the log data reception processing unit 11 stores the sensor log data that has been subjected to the above series of processes, in the analysis target log storage unit 33 as analysis target log data. The log data reception processing unit 11 may perform only either one of the process of selecting the sensor log data necessary for the analysis and the process of adding the extension information to the sensor log data.

(2-3) Analysis of Individual Attacks

Next, at step S4, the control unit 10 of the vehicle SOC server SSV analyzes the types of the individual attacks on the respective vehicles based on the analysis target log data under the control of the individual attack analysis processing unit 12.

Figure 8:
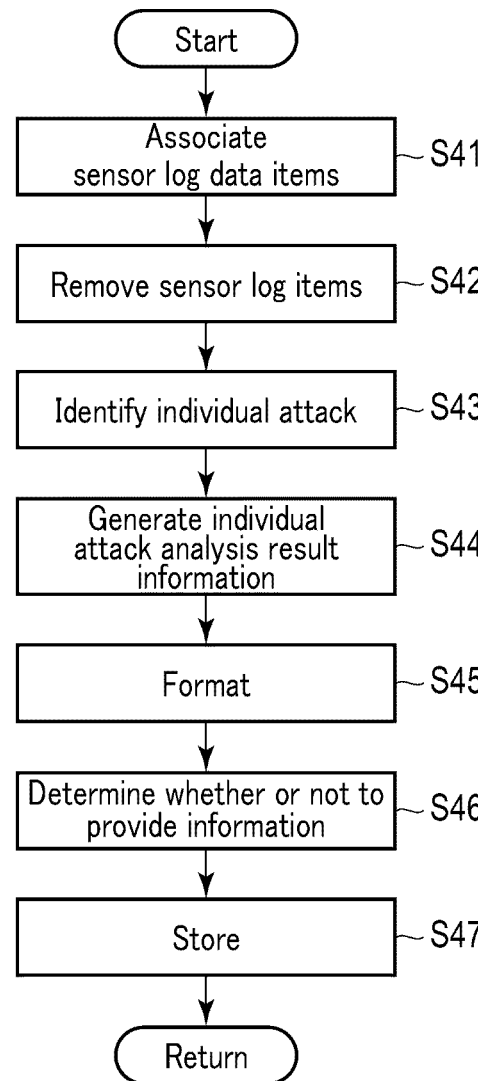
FIG. 8 is a flowchart showing an exemplary procedure and details of the individual attack analysis processing of FIG. 6.

FIG. 8 is a flowchart illustrating an exemplary procedure and details of the analysis processing by the individual attack analysis processing unit 12.

The individual attack analysis processing unit 12 reads the analysis target log data for each vehicle from the analysis target log storage unit 33. First, at step S41, the individual attack analysis processing unit 12 selects a plurality of log data items that may possibly constitute the same individual attack in accordance with the sensor log association rule, and associates the selected log data items with each other to generate a combination of log data items relating to the same attack. For instance, the conditions of the same vehicle identification number (VIN) and the detection times of the log data within a predetermined time period may be adopted, and the log data items that satisfy each condition are associated to generate a log data combination.

Subsequently, at step S42, the individual attack analysis processing unit 12 determines whether or not the above combination of the log data items is an unfeasible combination, based on the prestored knowledge information of individual attacks, and, based on this determination result, removes the unfeasible combination from the analysis targets in accordance with the sensor log exclusion rule.

Next, at step S43, the individual attack analysis processing unit 12 compares the combination of the log data items with each of the individual attack patterns defined in the knowledge information of the individual attacks in accordance with the individual attack ID assignment rule. Then, based on this comparison result, the individual attack analysis processing unit 12 identifies the individual attack pattern corresponding to the combination of the log data items, and assigns an individual attack ID corresponding to the identified individual attack pattern to the combination of the log data items. Specifically, the individual attack pattern may be identified based on at least one of the identification information of the sensor installation location and the sensor type included in the log data, and the individual attack ID of this pattern assigned.

An example of the above individual attack pattern identification process will be described using Examples 1 and 2 illustrated in FIGS. 10 and 11.

In Example 1 illustrated in FIG. 10, a combination of sensor logs L4, L5, and L6, a combination of sensor logs L1, L2, and L3, and a combination of sensor logs L7, L8, and L9, which are obtained respectively at times t1, t2, and t3 included in a predetermined period, correspond to individual attack patterns P2, P1, and P3, respectively, defined in the individual attack knowledge information. Therefore, the identification information P2, P1, and P3 are assigned as individual attack IDs to the combination of the sensor logs L4, L5, and L6, the combination of the sensor logs L1, L2, and L3, and the combination of the sensor logs L7, L8, and L9, respectively.

Figure 11:
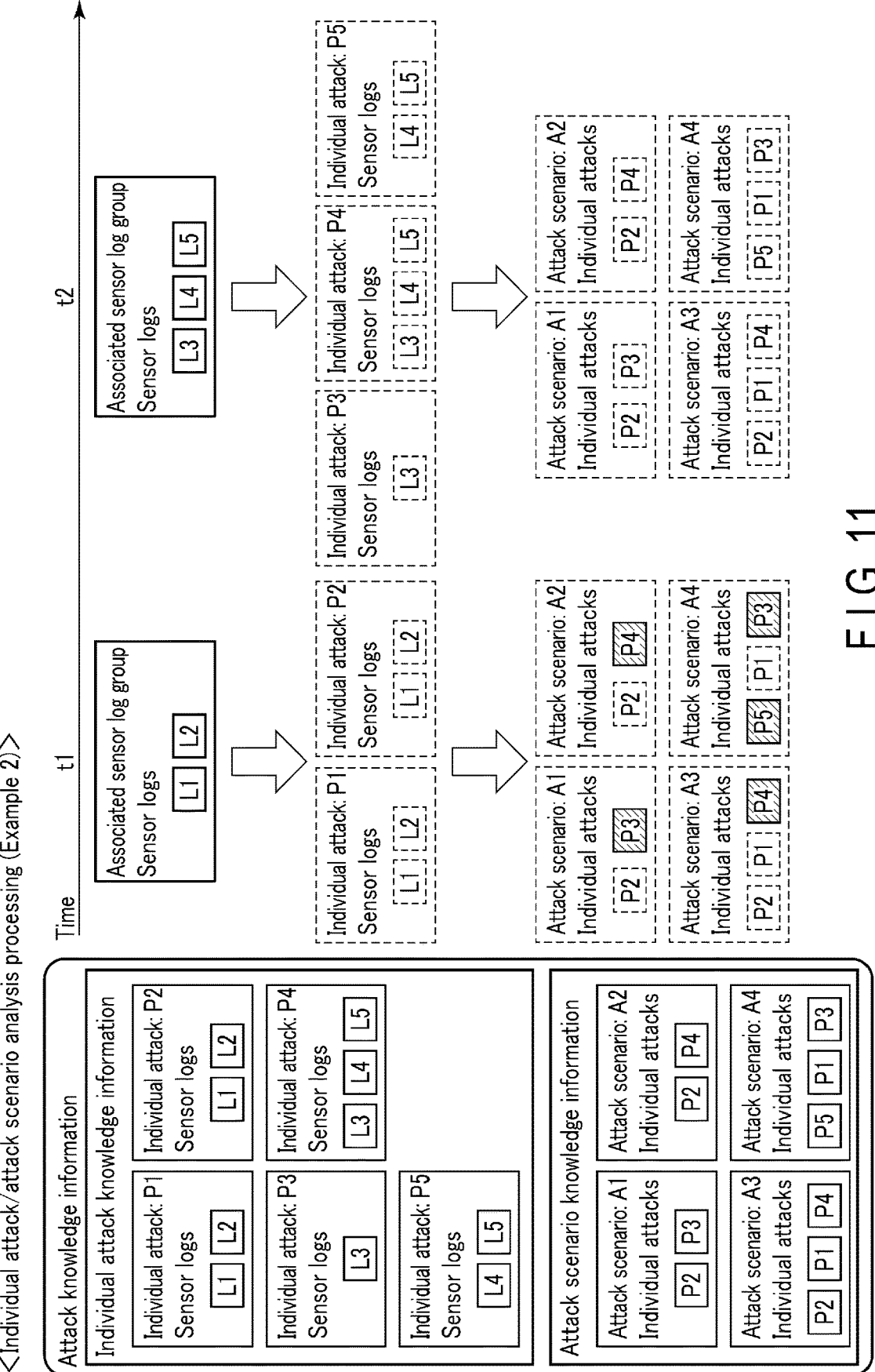
FIG. 11 is a diagram for explaining another example of the individual attack analysis processing and the attack scenario analysis processing in the processing procedure of FIG. 6.

In Example 2 illustrated in FIG. 11, the combination of sensor logs L1 and L2 obtained at time t1 corresponds to the individual attack patterns P1 and P2 defined in the individual attack knowledge information, and the combination of sensor logs L3, L4, and L5 obtained at subsequent time t2 corresponds to the individual attack patterns P3, P4, and P5 defined in the individual attack knowledge information. Therefore, the identification information P1 and the identification information P2 of the individual attack patterns are assigned as the individual attack IDs to the combinations of the sensor logs L1 and L2, and the individual attack patterns P3, P4, and P5 are assigned as the individual attack IDs to the combinations of the sensor logs L3, L4, and L5.

Next, at step S44, the individual attack analysis processing unit 12 writes values included in the sensor log data items that constitute the identified individual attack patterns into templates defined for the respective individual attack IDs in accordance with the individual attack analysis rule so as to generate information indicating the analysis result of the individual attacks, or in other words, analysis information indicating "point" attacks respectively on the individual vehicles MV1 to MVn.

Subsequently, at step S45, the individual attack analysis processing unit 12 formats the information representing the above analysis result in accordance with the attack scenario analysis result formatting rule. Further, at step S46, the individual attack analysis processing unit 12 determines whether or not the combination of the sensor log data items with the individual attack IDs assigned is information that can be provided for the attack scenario analysis, in accordance with the attack scenario analysis execution determination rule. For instance, if the combination of sensor log data items corresponds to a single individual attack, it is determined that an attack scenario analysis processing is necessary. On the other hand, in the case of corresponding to a plurality of individual attacks, it may be determined in some cases that the attack scenario analysis processing is unnecessary and in other cases that the attack scenario analysis processing is necessary. In the latter cases, an individual attack cannot be identified unless an attack scenario analysis is conducted. When it is determined that the attack scenario analysis processing is necessary, the individual attack analysis processing unit 12 stores the combination of the sensor log data items in the individual attack analysis result storage unit 34 at step S47.

(2-5) Analysis of Attack Scenarios

Next, at step S5, the control unit 10 of the vehicle SOC server SSV analyzes an attack scenario representing a series of attacks on the individual vehicles MV1 to MVn based on the information of the analysis results of the individual attacks under the control of the attack scenario analysis processing unit 13.

FIG. 9 is a flowchart showing an exemplary procedure and details of the attack scenario analysis processing by the attack scenario analysis processing unit 13.

The attack scenario analysis processing unit 13 reads information indicating the individual attack analysis results, or in other words, the individual attack IDs, for each of the vehicles MV1 to MVn and for each of the detection times from the individual attack analysis result storage unit 34. Here, at step S51, the attack scenario analysis processing unit 13 compares the individual attack IDs with the attack scenarios defined in the prestored attack scenario knowledge information, in accordance with the tentative linking rule. Based on this comparison result, all of the attack scenarios including these individual attack IDs are selected as attack scenario candidates at step S52. At step S53, the step position of the individual attack in the attack scenario candidates is also identified. Then, at step S54, the attack scenario analysis processing unit 13 tentatively associates the individual attack with all the candidate attack scenarios including this individual attack.

Subsequently, at step S55, the attack scenario analysis processing unit 13 determines whether or not the individual attacks obtained at different times constitute a specific attack scenario, or in other words, it determines the validity of the attack scenario, in accordance with the linking confirmation rule. Specifically, from among the candidate attack scenarios obtained at different detection times, an attack scenario candidate including all the individual attack IDs obtained at different detection times is identified as an attack scenario.

The above attack scenario identification process will be described using Examples 1 and 2 shown in FIGS. 10 and 11, respectively.

In Example 1 shown in FIG. 10, first, attack scenarios A1, A2, A3, and A4, which each include the individual attack P2 obtained at the first time t1, are selected as candidate attack scenarios. Then, from among the selected candidate attack scenarios A1, A2, A3, and A4, the candidate attack scenarios A3 and A4, which each include the individual attacks P1 obtained at the subsequent time t2, are selected. Similarly, the attack scenario A4 that includes the individual attack P3 obtained at the subsequent time t3 is identified as the attack scenario from the selected candidate attack scenarios A3 and A4. That is, in this example, the identified attack scenario A4 and a group of individual attacks P2, P1, and P3 constituting this attack scenario A4 are output as the analysis result.

In Example 2 shown in FIG. 11, the attack scenarios A1, A2, A3, and A4 that include the individual attacks P2 and P2 obtained at the first time t1 are first selected as candidate attack scenarios. At the subsequent time t2 also, A1, A2, A3, and A4 are selected as candidate attack scenarios that include the individual attacks P3, P4, and P5. In this example, all of A1, A2, A3, and A4 are ultimately identified as attack scenarios.

Subsequently at step S56, if the individual attacks corresponding to a group of sensor log data items associated by the above attack scenario analysis processing is uniquely determined, the attack scenario analysis processing unit 13 updates the analysis result of the individual attack. That is, even if the individual attack cannot be uniquely identified in the individual attack analysis processing and therefore the analysis result of the individual attack cannot be confirmed, the analysis result of the individual attack can still be confirmed when the individual attack analysis is uniquely identified from the result of the attack scenario analysis processing.

At step S57, the attack scenario analysis processing unit 13 generates information representing the analysis result of the attack scenario, or in other words, information representing the analysis result of "line" attacks, which represent a series of attacks on the individual vehicles, based on the analysis result of the attack scenario in accordance with the attack scenario analysis rule. For instance, the identified attack scenario, the individual attacks that constitute this attack scenario, and the sensor log data items that constitute these individual attacks are written into the template defined for each attack scenario, together with the individual attack knowledge information and the attack scenario knowledge information used for the respective analyses so as to generate the information representing the "line" analysis result.

Next, at step S58, the attack scenario analysis processing unit 13 formats the analysis result of the attack scenario as necessary in accordance with the attack scenario analysis result formatting rule. At step S59, the information indicating the attack scenario analysis result after the formatting process is stored in the attack scenario analysis result storage unit 35 in association with the identification information of the analysis target vehicle.

(2-6) Acquisition of Relationship Analysis Result of Attacks on Multiple Vehicles At step S6, the control unit 10 of the vehicle SOC server SSV acquires statistical information output by the relationship analysis processing unit 14 and stored in the statistical analysis result storage unit 36, where the statistical information indicates a series of "plane" attacks on multiple vehicles MV1 to MVn. The relationship analysis processing unit 14 reads the analysis results of the individual attacks and the analysis results of the attack scenarios for the vehicles from the individual attack analysis result storage unit 34 and the attack scenario analysis result storage unit 35, respectively, at regular intervals using a timer, for example.

Then, based on the read-out analysis results of the individual attacks or attack scenarios relating to the vehicles MV1 to MVn, the relationship analysis processing unit 14 acquires information obtained by compiling the individual attacks or attack scenarios for these vehicles. For instance, the analysis results are compiled for attacks on all vehicles made by a specific automobile manufacturer or attacks on vehicles of a specific type. The compiled information is stored in the statistical analysis result storage unit 36 as statistical information indicating a series of "plane" attacks on the vehicles MV1 to MVn.

(2-7) Acquisition of Trend Analysis Results of Attacks on Multiple Vehicles

At step S7, the control unit 10 of the vehicle SOC server SSV acquires statistical information output by the trend analysis processing unit 15 and stored in the statistical analysis result storage unit 36, where the statistical information indicates a series of "plane" attacks on the vehicles MV1 to MVn. The trend analysis processing unit 15 reads the analysis results of the individual attacks for the vehicles MV1 to MVn from the individual attack analysis result storage unit 34 and the analysis results of the attack scenarios from the attack scenario analysis result storage unit 35, at regular intervals using a timer, for example.

The trend analysis processing unit 15 analyzes the read-out analysis result of the individual attacks or the attack scenarios for vehicles from arbitrary viewpoints. For instance, trends in the attacks, such as infection of the in-vehicle device VU with malware, operations against the driver's intention, exploitation of information, takeover of the OS, and rewriting of firmware, may be analyzed for each automobile manufacturer, vehicle type, or model year. Then, the information indicating the analysis results is stored in the statistical analysis result storage unit 36 as statistical information indicating a series of "plane" attacks on the vehicles MV1 to MVn.

(2-8) Generation of Analysis Report

At step S8, the control unit 10 of the vehicle SOC server SSV reads, under the control of the analysis report generation processing unit 16, the analysis result of attack scenarios for each of the vehicles MV1 to MVn from the attack scenario analysis result storage unit 35, reads the analysis results of the individual attacks that constitute an attack scenario from the individual attack analysis result storage unit 34, and further reads sensor log data items that constitute these individual attacks from the analysis target log storage unit 33.

The analysis report generation processing unit 16 generates analysis report information in accordance with a template for each vehicle prepared in advance, based on the read-out analysis results and sensor log data. In this manner, analysis report information may be generated, for example, for each of the vehicles MV1 to MVn, in which the analysis result of the individual attacks, that is, "point" attacks, and the analysis result of the attack scenarios, that is, "line" attacks, are reflected. The analysis report generation processing unit 16 stores the analysis report information generated for each of the vehicles MV1 to MVn in the analysis report storage unit 37.

The analysis report generation processing unit 16 reads the statistical information acquired at steps S6 and S7, such as information indicating the analysis results of the relationship between and trends in attacks on the vehicles MV1 to MVn for each automobile manufacturer, each vehicle type, or each model year, or in other words, information indicating the analysis results of "plane" attacks. Based on the read-out information of each read analysis result, analysis report information is generated according to a template prepared in advance for each automobile manufacturer, each vehicle type, or each model year. In this manner, analysis report information, in which the statistical analysis results of "plane" attacks are reflected, can be generated, for example for each automobile manufacturer, each vehicle type, or each model year. The analysis report generation processing unit 16 stores the generated analysis report information for each automobile manufacturer, each vehicle type, or each model year, in the analysis report storage unit 37.

(3) Provision of Analysis Report Information

At step S9, the control unit 10 of the vehicle SOC server SSV monitors acquisition requests for an analysis report. In this situation, if an analysis report acquisition request is sent from the SIRT server ISV, the control unit 10 of the vehicle SOC server SSV reads the analysis report information designated in the acquisition request from the analysis report storage unit 37 at step S10, under the control of the analysis report transmission processing unit 17. Thereafter, the read-out analysis report information is transmitted through the communication I/F 40 to the request source SIRT server ISV.

The control unit 10 of the vehicle SOC server SSV may be configured to provide the SIRT server ISV with the analysis results as-is of the individual attacks, of the attack scenarios, of the relationship, and of the trends, without generating analysis report information. The analysis results to be provided may be all of, or part of, the analysis results. In other words, the analysis results may be provided selectively in response to a request from the SIRT server ISV.

(Functions and Effects)

In the embodiment described above, the vehicle SOC server SSV acquires from the OEM center CN of the automobile manufacturer a plurality of sensor log data items generated in the in-vehicle device VU of each of the vehicles MV1 to MVn. The vehicle SOC server SSV first detects a combination of sensor log data items having a possibility of constituting the same individual attack based on the acquired sensor log data items and thereby identifies an individual attack pattern. Subsequently, the vehicle SOC server SSV identifies an attack scenario by focusing on combinations of individual attack patterns that have occurred within a predetermined period. Then, the vehicle SOC server SSV generates and outputs analysis report information for each vehicle based on the identified attack scenario, the individual attack patterns that constitute this attack scenario, and the sensor log data items constituting the individual attack patterns.

This means that it is possible to identify not only isolated individual attacks on the individual vehicles but also an attack scenario from the relationship between individual attack patterns that occur within a predetermined time period, and to generate and provide an analysis report by taking all of these into consideration. That is, attacks that involve different stages and different means are considered to be a series of attacks, or in other words an attack scenario, which allows the SIRT server ISV to easily identify the success factor of attacks and extent of the impact.

In the embodiment, prior to the analysis processing of the individual attacks, the log data reception processing unit 11 extracts the analysis target log data from the sensor log data in accordance with the filtering rule and adds extension information in accordance with the extension rule. The log data reception processing unit 11 further determines as to whether or not the log data is necessary for the analysis processing of the individual attacks, as necessary, in accordance with the pre-analysis rule so that only necessary log data can be provided for the analysis processing of the individual attacks. Thus, the analysis processing of individual attacks can be conducted on the limited amount of log data, which can improve the analysis accuracy of individual attacks, while reducing the processing load and time.

Furthermore, in the embodiment, it is determined in the analysis processing of the individual attacks whether or not the analysis result of the individual attacks is information that should be provided for the analysis of the attack scenario. If, for instance, the combination of the sensor log data items corresponds to a single individual attack, it is determined that the attack scenario analysis processing is necessary. On the other hand, if the combination corresponds to a plurality of individual attacks, the attack scenario analysis processing may be determined to be unnecessary, or may be determined to be necessary. The necessity of the analysis processing of the attack scenario therefore needs to be determined. When it is determined that the attack scenario analysis processing is necessary, the combination of the sensor log data items at that time is provided for the attack scenario analysis, and when it is determined that the attack scenario analysis processing is unnecessary, the combination is excluded from the provision target. Thus, the analysis processing of the attack scenario can be performed upon the limited analysis results of the individual attacks, as a result of which the analysis accuracy of the attack scenario can be improved, and the processing load and time can be reduced.

Further, in the embodiment, the relationship between and trends in attacks for each automobile manufacturer, each vehicle type, or each model year are analyzed based on the analysis results of the individual attacks on the vehicles MV1 to MVn and the analysis results of the attack scenarios, and this analysis result is reflected in the analysis report. Thus, the automobile manufacturer can take countermeasures against attacks on the basis of the automobile manufacturer, the vehicle type, or the model year in addition to countermeasures against attacks on individual vehicles.

Other Embodiments (1) In the above embodiment, the sensor log data generated in the in-vehicle device VU is acquired via the network MNW and the OEM center CN. The present invention is not limited to this example, however. For example, the sensor log data generated in the in-vehicle device VU in an auto repair shop or the like may be stored in a storage medium and provided to the vehicle SOC server SSV so that the vehicle SOC server SSV can read the sensor log data from this recording medium and execute analysis processing.

(2) In the above embodiment, all the functions of the vehicle security analysis apparatus are realized by one vehicle SOC server SSV. The present invention is not limited to this example, however. For example, a plurality of vehicle SOC servers may be provided so that the functions of the vehicle security analysis apparatus can be distributed to these vehicle SOC servers. In this case, as a method of distributing the functions, the analysis processing of individual attacks, the analysis processing of attack scenarios, and the analysis processing of the trends and relationship may be allocated to different servers. Alternatively, the analysis processing of the individual attacks and the analysis processing of the attack scenarios may be allocated to one server, and the analysis processing of the trends and relationship may be allocated to one or two other servers.

(3) The analysis processing of individual attacks and the analysis processing of attack scenarios may be individually or collectively realized by using, for example, a neural network that includes a supervised learning model. In addition, the configuration of the vehicle security analysis apparatus, the procedure and details of each analysis process, the configuration of an analysis report, and the like can be variously modified and implemented without departing from the scope of the present invention.

The embodiments of the present invention have been described in detail above. The foregoing description is merely examples of the present invention in all respects. Various improvements and modifications can be added without departing from the scope of the invention. In other words, a specific configuration according to the embodiment may be adopted as appropriate in implementation of the present invention.

The present invention should not be limited to the above-described embodiments as-is, but may be embodied by modifying the components at the implementation stage without departing from the scope of the invention. In addition, various inventions may be constituted by appropriately combining a plurality of components disclosed in the embodiments. For example, some components may be omitted from the components shown in the embodiments. Furthermore, the components of different embodiments may be suitably combined.

REFERENCE SIGNS LIST

MV1 to MVn Vehicle
VU In-vehicle device
SSV Vehicle SOC server
ISV SIRT server
CN OEM center of automobile manufacturer
OSV Management server
MNW Mobile communication network
INW Internet
GW1, GW2 Gateway
ESV External server
1 In-vehicle gateway
2 In-vehicle network (CAN)
3 Navigation apparatus (IVI)
4 Electronic control unit (ECU)
5 Communication control unit (TCU)
10 Control unit
11 Log data reception processing unit
12 Individual attack analysis processing unit
13 Attack scenario analysis processing unit
14 Relationship analysis processing unit 15 Trend analysis processing unit
16 Analysis report generation processing unit
17 Analysis report transmission processing unit
20 Program storage unit
30 Data storage unit
31 Log data storage unit
32 Extension information storage unit
33 Analysis target log storage unit
34 Individual attack analysis result storage unit
35 Attack scenario analysis result storage unit
36 Statistical analysis result storage unit
37 Analysis report storage unit
40 Communication I/F
50 Bus

What is claimed is:

1. A vehicle security analysis apparatus for acquiring and analyzing sensor log data relating to an operational state of an in-vehicle device mounted on a vehicle, the apparatus comprising:

processing circuitry configured to acquire and store the sensor log data;

generate multiple combinations, each combination including a plurality of items of the sensor log data constituting an identical individual attack from among a plurality of items of the stored sensor log data, for each of the multiple combinations: (i) compare the generated combination of the items of the sensor log data with a plurality of individual attack patterns predefined as individual attack knowledge information to identify a corresponding individual attack pattern, and (ii) generate first analysis information that includes information indicating the identified individual attack pattern, such that the processing circuitry identifies multiple individual attack patterns corresponding to each of the multiple combinations, at least two of the attack patterns having an overlapping item of sensor log data;

compare the plurality of individual attack patterns obtained within a predetermined time period with attack scenarios predefined as attack scenario knowledge information to identify multiple different attack scenarios each constituted by the plurality of individual attack patterns, and generate second analysis information that includes information indicating the identified attack scenarios; and output an analysis result including the generated first analysis information and the generated second analysis information.

2. The vehicle security analysis apparatus according to claim 1, wherein the processing circuitry is configured to select a sensor log data item as an analysis target for the individual attack to be analyzed from among the items of the stored sensor log data and provide the selected sensor log data item as the analysis target.

3. The vehicle security analysis apparatus according to claim 1, further comprising:

wherein the processing circuitry is configured to add extension information necessary for analysis of the individual attack pattern to the items of the stored sensor log data based on contents of the sensor log data and provide the sensor log data to which the extension information is added, as an analysis target.

4. The vehicle security analysis apparatus according to claim 1, wherein wherein the processing circuitry generates the combination of the items of the sensor log data by associating a plurality of items of the sensor log data having identical identification information of a vehicle that serves as a generation source of the sensor log data and having generation times within a specific time period.

5. The vehicle security analysis apparatus according to claim 1, wherein wherein the processing circuitry compares information included in the sensor log data with the plurality of individual attack patterns, the information indicating at least one of a sensor installation location and a sensor type, and the first analysis processing unit thereby identifies the corresponding individual attack pattern.

6. The vehicle security analysis apparatus according to claim 1, wherein wherein the processing circuitry generates the first analysis information by describing contents of the items of the sensor log data that constitute an individual attack pattern, in a template predefined for each of the identified plurality of individual attack patterns.

7. The vehicle security analysis apparatus according to claim 1, wherein wherein the processing circuitry determines whether or not an identified individual attack pattern is information to be provided for analysis of the attack scenario based on a determination condition predefined for an analysis target of the attack scenario, and does not provide the individual attack pattern to the second analysis processing unit if the individual attack pattern is not to be provided.

8. The vehicle security analysis apparatus according to claim 1, wherein wherein the processing circuitry compares the plurality of individual attack patterns with the attack scenarios predefined as the attack scenario knowledge information, and identifies the attack scenario that includes the plurality of individual attack patterns and in which occurrence timings of the plurality of individual attack patterns are included within a predetermined time period.

9. The vehicle security analysis apparatus according to claim 1, wherein wherein the processing circuitry generates the second analysis information by describing the plurality of individual attack patterns included in the attack scenario and contents of the items of the sensor log data that constitute the plurality of individual attack patterns, in a template predefined for each of the identified attack scenarios.

10. A vehicle security analysis method executed by an apparatus that acquires and analyzes sensor log data relating to an operational state of an in-vehicle device mounted on a vehicle, the vehicle security analysis method comprising:

acquiring and storing the sensor log data;

generating multiple combinations, each combination including a plurality of items of the sensor log data constituting an identical individual attack among a plurality of items of the stored sensor log data, for each of the multiple combinations: (i) comparing the generated combination of the items of the sensor log data with a plurality of individual attack patterns predefined as individual attack knowledge information to identify a corresponding individual attack pattern, and (ii) generating first analysis information including information indicating the identified individual attack pattern, such that multiple individual attack patterns are identified corresponding to each of the multiple combinations, at least two of the attack patterns having an overlapping item of sensor log data;

comparing a combination of the plurality of individual attack patterns obtained within a predetermined time period with a plurality of attack scenarios predefined as attack scenario knowledge information to identify multiple different attack scenarios each constituted by the plurality of individual attack patterns, and generating second analysis information including information indicating the identified attack scenarios; and outputting an analysis result including the generated first analysis information and the generated second analysis information.

11. A non-transitory computer-readable medium storing a program for causing a processor included in a vehicle security analysis apparatus to execute a method of acquiring and analyzing sensor log data relating to an operational state of an in-vehicle device mounted on a vehicle, the method comprising:

acquiring and storing the sensor log data;

generating multiple combinations, each combination including a plurality of items of the sensor log data constituting an identical individual attack among a plurality of items of the stored sensor log data, for each of the multiple combinations: (i) comparing the generated combination of the items of the sensor log data with a plurality of individual attack patterns predefined as individual attack knowledge information to identify a corresponding individual attack pattern, and (ii) generating first analysis information including information indicating the identified individual attack pattern, such that multiple individual attack patterns are identified corresponding to each of the multiple combinations, at least two of the attack patterns having an overlapping item of sensor log data;

comparing a combination of the individual attack patterns obtained within a predetermined time period with a plurality of attack scenarios predefined as attack scenario knowledge information to identify multiple different attack scenarios each constituted by the plurality of individual attack patterns, and generating second analysis information including information indicating the identified attack scenarios; and outputting an analysis result including the generated first analysis information and the generated second analysis information.

\* \* \* \* \*